United States Patent
Petri

(10) Patent No.: US 7,958,440 B2
(45) Date of Patent: Jun. 7, 2011

(54) BURSTING MULTIPLE ELEMENTS IN A SINGLE OBJECT IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1124 days.

(21) Appl. No.: 11/684,071

(22) Filed: Mar. 9, 2007

(65) Prior Publication Data

US 2008/0222178 A1     Sep. 11, 2008

(51) Int. Cl.
*G06N 3/00* (2006.01)
(52) U.S. Cl. .................................. 715/200; 715/234
(58) Field of Classification Search .................. 715/234, 715/243, 254, 200
See application file for complete search history.

(56) References Cited

U.S. PATENT DOCUMENTS

| | | | |
|---|---|---|---|
| 6,999,972 B2* | 2/2006 | Lusen et al. | 707/756 |
| 7,197,510 B2* | 3/2007 | Abe et al. | 1/1 |
| 7,721,193 B2* | 5/2010 | Upton | 715/234 |
| 2004/0254928 A1* | 12/2004 | Vronay et al. | 707/5 |
| 2006/0010168 A1* | 1/2006 | Lusen et al. | 707/104.1 |
| 2007/0005657 A1* | 1/2007 | Bohannon et al. | 707/200 |
| 2007/0143331 A1* | 6/2007 | Holtz et al. | 707/102 |
| 2008/0005132 A1* | 1/2008 | Herbeck et al. | 707/100 |
| 2008/0077850 A1* | 3/2008 | Gauthier et al. | 715/234 |

* cited by examiner

*Primary Examiner* — Kyle R Stork
(74) *Attorney, Agent, or Firm* — Martin & Associates, LLC; Derek P. Martin

(57) ABSTRACT

A content management system (CMS) allows defining multi-element burst rules that allow multiple elements to be bursted to a single object. A multi-element burst mechanism performs the bursting of multiple elements when a multi-element burst rule is processed. A multi-element burst policy allows a user to specify conditions that govern the function of the multi-element burst mechanism. The result is a CMS that includes multiple elements in a single object, thereby enhancing reusability of content in the CMS.

20 Claims, 11 Drawing Sheets

400

```
<root>
    <elem1>
        Here is some sample text for elem1
    </elem1>
    <elem2>
        Here is some sample text for elem2
    </elem2>
</root>
```

| CMS attribute name | CMS attribute value |
|---|---|
| object_id | 9829837 |
| doc_name | doc1 |

510

```
<root>
    <xi:include href="score://obj_id:9829838&binding=CURRENT"/>
    <xi:include href="score://obj_id:9829839&binding=CURRENT"/>
</root>
```

Link to 600 in FIG. 6

Link to 700 in FIG. 7

```
<xsd:schema xmlns:xsd="http://www.w3.org/2001/XMLSchema">
  <xsd:element name="elem1" type="xsd:string"/>
  <xsd:element name="elem2" type="xsd:string"/>
  <xsd:element name="elem3" type="xsd:string"/>
  <xsd:element name="root">
    <xsd:complexType>
      <xsd:sequence>
        <xsd:element ref="elem1"/>
        <xsd:element ref="elem2"/>
        <xsd:element ref="elem3"/>
      </xsd:sequence>
    </xsd:complexType>
  </xsd:element>
</xsd:schema>
```

FIG. 15

```
<Bursting>
    <ObjectMappingRule contentXPath="/root/elem3" doctypeRef="bursted_node"
            initialStateType="in_progress" lifecycleType="1" type="automatic" version="CURRENT"/>
    <ObjectMappingRuleRange rangeType="sequence" doctypeRef="bursted_node"
            initialStateType="in_progress" lifecycleType="1" type="automatic" version="CURRENT">
        <RangeStart contentXPath="/root/elem1"/>
        <RangeEnd contentXPath="/root/elem2"/>
    </ObjectMappingRuleRange>
</Bursting>
```

1610 — first ObjectMappingRule block
1620 — ObjectMappingRuleRange block

FIG. 16

```
<root>
    <elem1>
        Here is some sample text for elem1 in source document 1
    </elem1>
    <elem2>
        Here is some sample text for elem2
    </elem2>
    <elem3>
        Here is some sample text for elem2
    </elem3>
</root>
```

FIG. 17

```
<root>
    <elem1>
        Here is some *sample text for elem1 in source document 1*
    *</elem1>*
    *<elem2>*
        *Here is some sample text for elem2*
    *</elem2>*
    <elem3>
        Here is some sample text for elem2
    </elem3>
</root>
```

FIG. 18

| CMS attribute name | CMS attribute value |
|---|---|
| object_id | 9829841 |
| doc_name | doc5 |

<?parentElem name="elem1"?>sample text for elem1 in source document 1
    </elem1>
    <elem2>
        Here is some sample text for elem2
    </elem2>

FIG. 19

<root>
    <elem1>
        Here is some sample text for *(user's cursor is here)* elem1 in a different source document
    </elem1>
</root>

FIG. 20

<root>
    <elem1>
        Here is some sample text for *<?Insert object_id=9829841?><?Start object_id=9829841?><?parentElem name="elem1"?>sample text for elem1 in source document 1<?End object_id=9829841?>* elem1 in a different source document
    </elem1>
    *<?Start object_id=9829841?>*
    *<elem2>*
        *Here is some sample text for elem2*
    *</elem2>*
    *<?End object_id=9829841?>*
</root>

FIG. 21

| CMS attribute name | CMS attribute value |
|---|---|
| object_id | 9829842 |
| doc_name | doc6 |

```
<root>
    <elem1>
        Here is some sample text for <?Insert
object_id=9829841?> elem1 in a different source document
    </elem1>
</root>
```

FIG. 22

BURSTING MULTIPLE ELEMENTS IN A SINGLE OBJECT IN A CONTENT MANAGEMENT SYSTEM

BACKGROUND

1. Technical Field

This disclosure generally relates to content management systems, and more specifically relates to a content management system that allows bursting multiple elements in a single object.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, synchronization and linking. Bursting rules govern how a document is bursted, or broken into individual chunks, when the document is checked into the repository. By bursting a document into chunks, the individual chunks may be potentially reused later by a different author. Synchronization rules govern synchronization between content and metadata related to the content. For example, a synchronization rule may specify that whenever a specified CMS attribute is changed, a particular piece of XML in the content should be automatically updated with that attribute's value. Linking rules govern what content in a repository a user may link to in a document that will be subsequently checked into the repository.

Bursting rules allow an element in a document to be saved as an object in the CMS so the element may be reused by other authors. Known bursting rules only work on a single element, and only work on the boundaries of a single element. Thus, if three different elements in a document need to be bursted, each of the three will be bursted to its own object in the CMS, and each element in the document will be replaced by a link to the object in the CMS.

Sometimes neighboring elements in a document are often used together. If an author specifies to burst two neighboring elements in the prior art, each of the two elements is individually bursted to their own respective objects. When these two elements are to be reused in a new document, the author must specify both elements in the new document. This is inefficient when the two elements are always used together. Without a way to burst multiple elements to a single object in a CMS, the reusability of content in the CMS will impaired.

BRIEF SUMMARY

A content management system (CMS) allows defining multi-element burst rules that allow multiple elements to be bursted to a single object. A multi-element burst mechanism performs the bursting of multiple elements when a multi-element burst rule is processed. A multi-element burst policy allows a user to specify conditions that govern the function of the multi-element burst mechanism. The result is a CMS that includes multiple elements in a single object, thereby enhancing reusability of content in the CMS.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 4 shows a sample XML document;

FIG. 5 shows the sample XML document in FIG. 4 after checking the document into the prior art content management system that uses method 200 in FIG. 2 and rules 300 in FIG. 3;

FIG. 15 is a sample XML schema;

FIG. 16 shows two sample bursting rules, one for a single element, and one for two elements;

FIG. 17 is a sample XML document based on the schema in FIG. 15;

FIG. 18 shows what portion of the XML document in FIG. 17 is highlighted by a user;

FIG. 19 shows a new object that is created that includes the highlighted portions of the two elements shown in FIG. 18;

FIG. 20 shows a new XML document where reuse of the object in FIG. 19 is desired;

FIG. 21 shows the new XML document in FIG. 20 when the XML document in FIG. 19 is inserted at the current cursor location; and FIG. 22 shows how the document in FIG. 21 is stored in the repository.

DETAILED DESCRIPTION

The claims and disclosure herein provide a content management system (CMS) that includes one or more multi-element bursting rules, a multi-element burst mechanism, and a multi-element burst policy that governs the function of the multi-element burst mechanism. The multi-element burst mechanism allows bursting multiple elements in a document into a single object in the CMS repository. Bursting multiple elements into a single object enhances and simplifies the reuse of these multiple objects.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
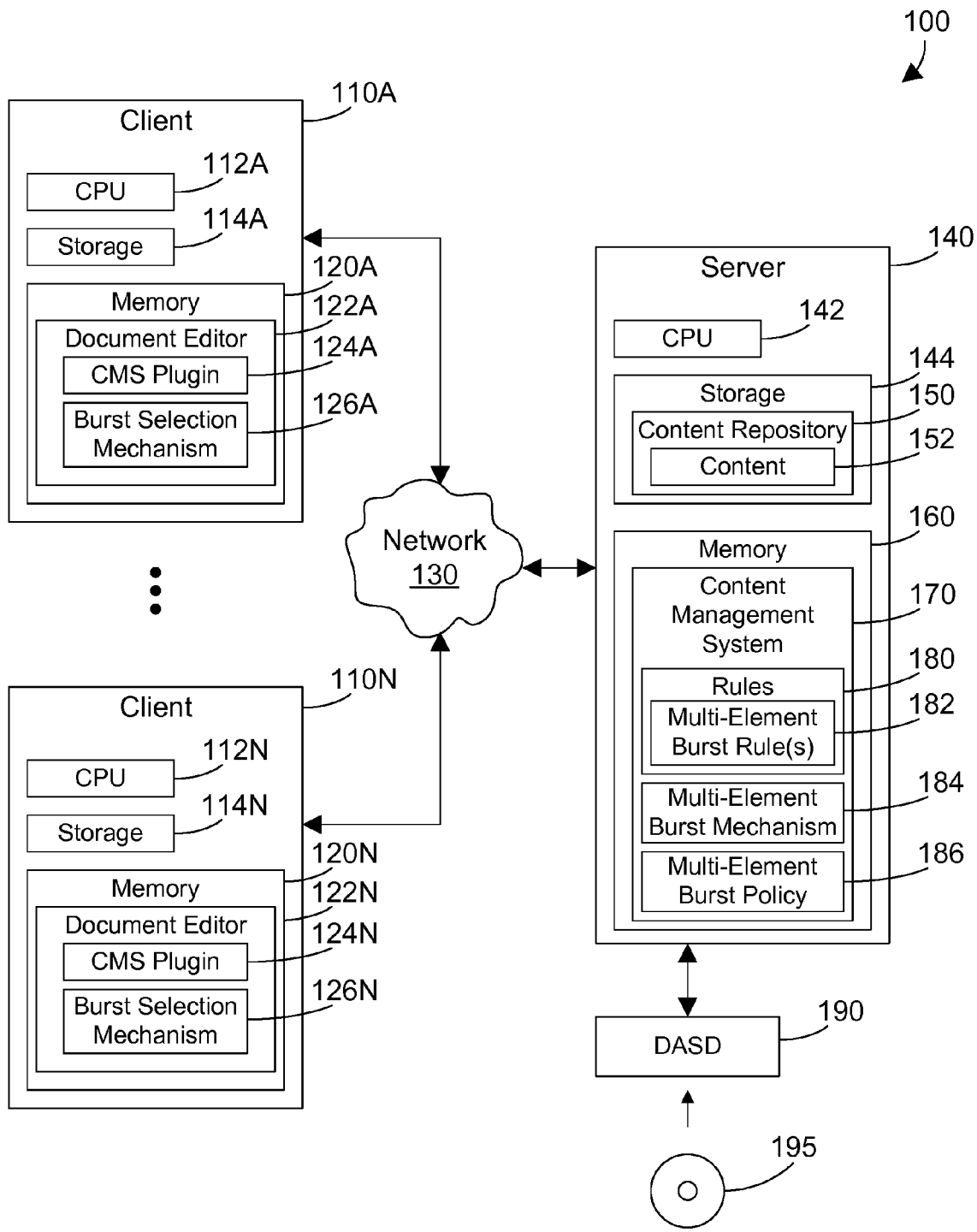
FIG. 1 is a block diagram of a networked computer system that includes a server computer system that has a content management system that includes multi-element burst rules, a multi-element burst mechanism, and a multi-element burst policy.

Referring to FIG. 1, networked computer system 100 includes multiple clients, shown in FIG. 1 as clients 110A, ..., 110N, coupled to a network 130. Each client preferably includes a CPU, storage, and memory that contains a document editor, a content management system (CMS) plugin, and a burst selection mechanism. Thus, client 110A includes a CPU 112A, storage 114A, memory 120A, a document editor 122A in the memory 120A that is executed by the CPU 112A, a CMS plugin 124A that allows the document editor 122A to interact with content 152 in the repository 150 that is managed by the CMS 170 in server 140, and a burst selection mechanism 126A that allows the user to specify which portions of a displayed document to burst to the repository. In similar fashion, other clients have similar components shown in client 110A, through client 110N, which includes a CPU 112N, storage 114N, memory 120N, a document editor 122N, a CMS plugin 124N, and a burst selection mechanism 126N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180. Rules 180 specify at least one criterion related to content in the repository, and may include one or more multi-element burst rules 182. A multi-element burst rule 182 specifies to burst multiple elements to a single object in the repository 150. CMS 170 further includes a multi-element burst mechanism 184 that reads a multi-element burst rule 182 and determines whether a document satisfies the multi-element burst rule 182. If so, the multi-element burst mechanism 184 bursts multiple elements to a single object in the repository 150. CMS 170 also includes a multi-element burst policy 186, which specifies at least one criterion that determines when the multi-element burst mechanism 184 bursts multiple elements into a single object.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, ..., 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
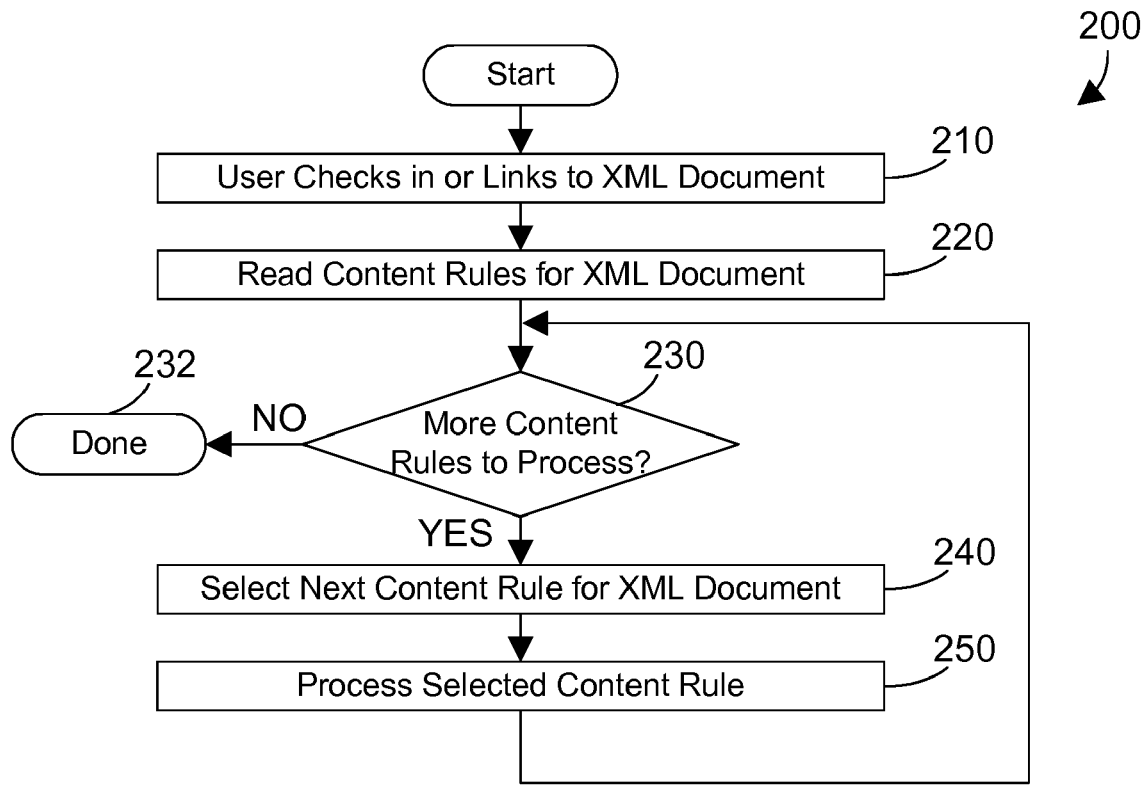
FIG. 2 is a flow diagram of a prior art method for a known content management system.

Referring to FIG. 2, a flow diagram shows a prior art method 200 that is used by known content management systems that handle content in the form of XML documents. Method 200 begins when a user checks in an XML document to the repository, or links to an XML document in the repository (step 210). If there are corresponding content rules for the XML document being checked in or linked to, these content rules are read (step 220). If there are more content rules to process (step 230=YES), the next content rule for the XML document is selected (step 240), and the selected content rule is processed (step 250). Method 200 then loops back to step 230, and if there are more content rules to process (step 230=YES), steps 240 and 250 are repeated for the next content rule, and so on until there are no more content rules to process (step 230=NO), at which point method 200 is done (step 232).

Figure 3:
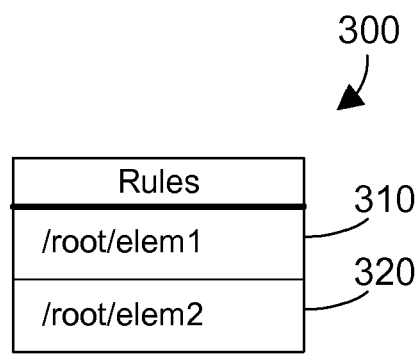
FIG. 3 is a table showing sample rules for a prior art content management system.
Figure 6:
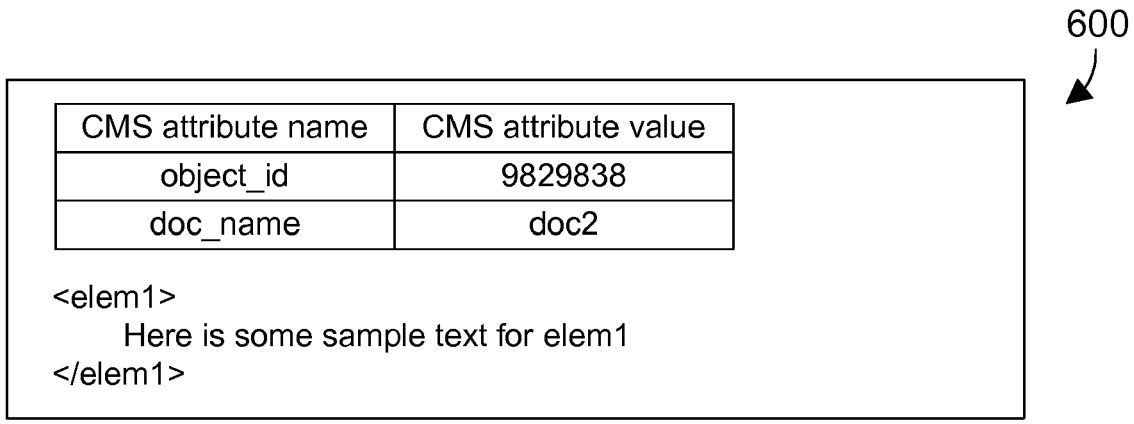
FIG. 6 shows a sample object in a content management system that contains the text for the element elem1.
Figure 7:
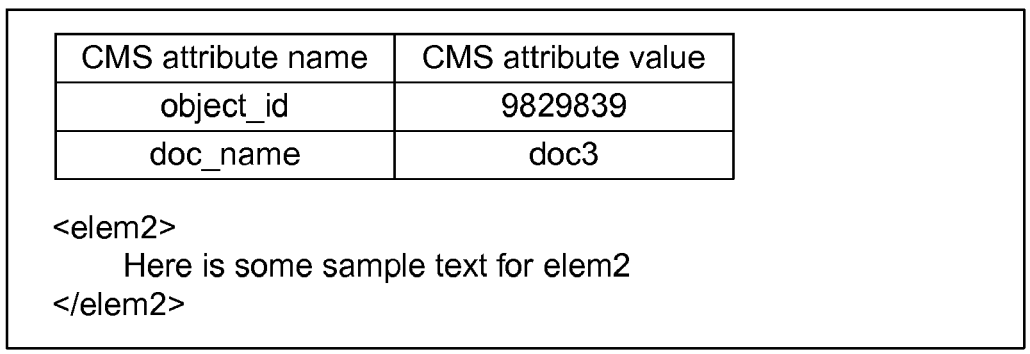
FIG. 7 shows a sample object in a content management system that contains the text for the element elem2.

Sample bursting rules similar to those known in the art are shown in table 300 in FIG. 3. These two content rules are Xpath expressions that identify a burst location within a source XML document. XPath is a standard mechanism for locating information within an XML document. A simple XPath expression is similar to a file path on a PC for finding a document. In other words, it is used to locate data in the XML from a particular context (such as the root element). For example, rule 310 specifies /root/elem1, which specifies to burst any elem1 element that is the child of the root element of an XML document. Similarly, rule 320 specifies /root/elem2, which specifies to burst any elem2 element that is the child of the root element of an XML document.

To understand the example in FIGS. 2-7, linking and bursting in a known CMS needs to be explained. Many content management systems recognize that one way to increase the power of a CMS is to chop content up into smaller chunks that will increase the likelihood that these chunks may be reused for another document. This is known in the art as bursting or chunking. For simplicity herein, we call this bursting, recognizing that different terms apply today to this process and new terms may be developed in the future for this process. When an XML document is checked into a repository controlled by a CMS, the CMS may use rules to determine how to burst the XML document into smaller portions. Bursting requires linking in the original XML document. In essence, an XML document may be dissected up into component chunks (or objects), with each chunk now having its own identity in the repository. Once each chunk has its own identity in the repository, a chunk that was previously in the original XML document may be replaced by a link to the chunk in the repository. We see from this discussion that bursting inherently requires linking, so the content that was bursted may be stored in the repository and that content in the original XML document may be replaced by a link to the chunk in the repository.

Table 300 in FIG. 3 includes two rules 310 and 320. As stated above, rule 310 specifies to burst any element named elem1 that is the child of the root element of an XML document, and rule 320 specifies to burst any element named elem2 that is the child of the root element of an XML document. We assume that content rules 310 and 320 are applied to the sample XML document 400 shown in FIG. 4.

We now consider the sample XML document 400 in FIG. 4. We assume a user has authored this document using a document editor, such as document editor 122A in FIG. 1. When this document is checked into the repository, the CMS runs method 200 in FIG. 2. The content rules 310 and 320 in FIG. 3 are read. As the document is checked in, the rules 310 and 320 are applied to determine how to burst the document. The result of running rules 310 and 320 against the XML document 400 in FIG. 4 is shown in document 500 in FIG. 5. Rule 310 specifies that elem1 should be bursted. We assume elem1 is bursted to an object 600 shown in FIG. 6. This object 600 includes the object_id of 9829838, which is a unique numerical identifier assigned by the CMS when the object is initially created in the repository. Object 600 also has a doc_name of doc2, and the text of elem1. A link to object 600 is then inserted into the XML document, as shown at 510 in FIG. 5. In similar fashion, rule 320 specifies that elem2 should be bursted. We assume elem2 is bursted to an object 700 shown in FIG. 7. This object 700 includes the object_id of 9829839, a doc_name of doc3, and the text of elem2. A link to object 700 is then inserted into the XML document, as shown at 520 in FIG. 5. Note also that when XML document 400 is checked into the repository, the object 500 is created with attributes and values in table 510 that uniquely identify XML document 500 in the repository. The object_id in table 410 is 9829837, and the doc_name is doc1.

The simple example shown in FIGS. 2-7 illustrate graphically how prior art content management systems apply existing bursting rules when content is checked in. One of the features of the prior art as shown in FIGS. 2-7 is that each bursting rule relates to a single element. As a result, each element to be bursted is stored in its own object in the repository. Nowhere does the prior art allow multiple elements to be bursted to a single object.

Figure 8:
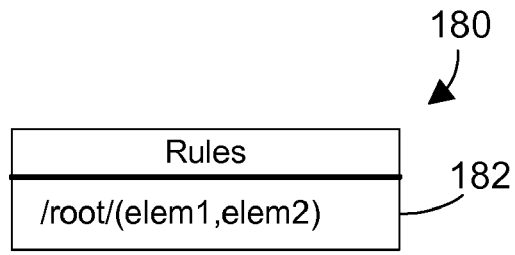
FIG. 8 is a table showing a multi-element bursting rule.
Figure 9:
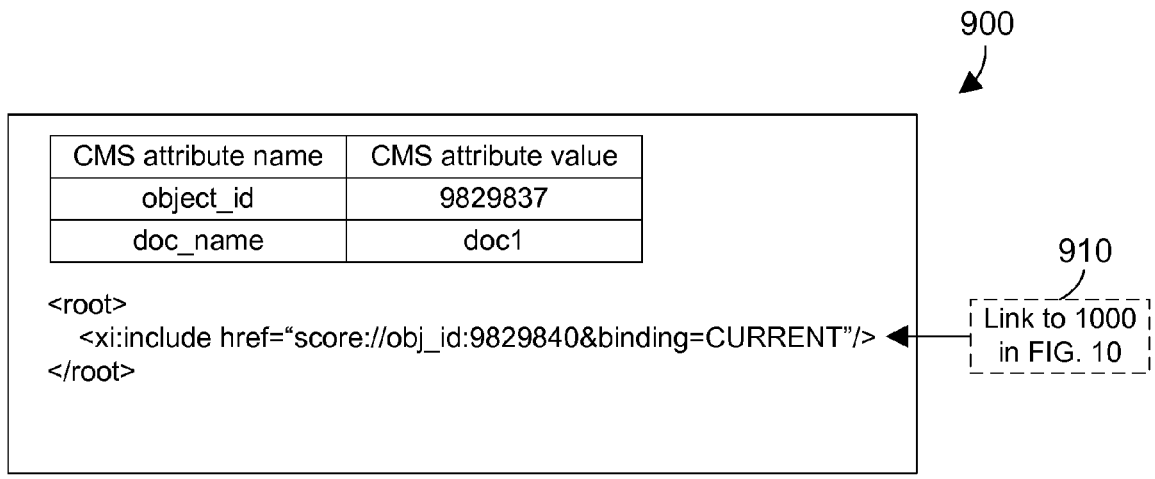
FIG. 9 shows the sample XML document in FIG. 4 after checking the document into the content management system 170 in FIG. 1 that includes the multi-element bursting rule shown in FIG. 8.
Figure 10:
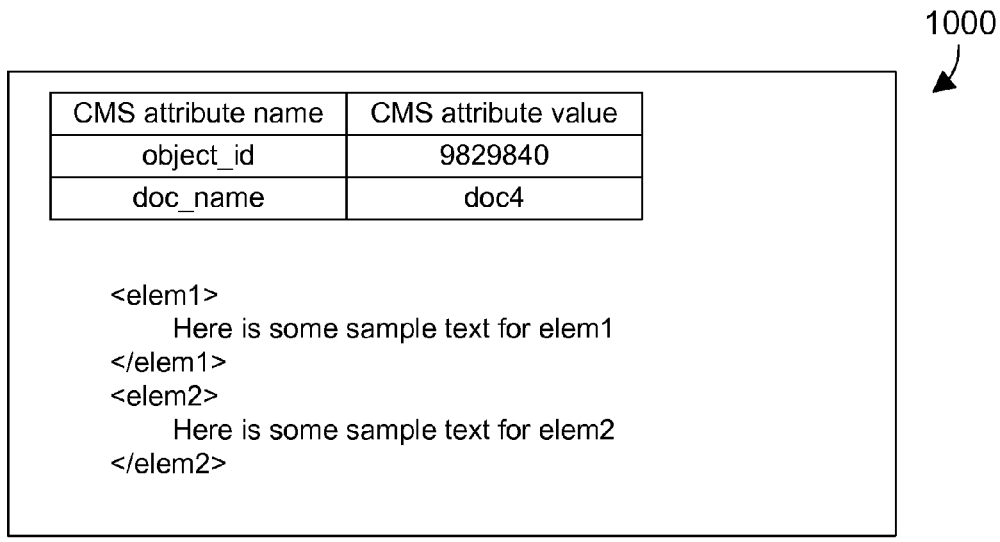
FIG. 10 shows a sample XML document in the CMS that include multiple elements, namely elem1 and elem2.

Referring to FIG. 8, the disclosure and claims herein extend to content rules 180 in a content management system that include one or more multi-element burst rules that specify to burst multiple elements in a document to a single object in the repository. In the specific example in FIG. 8, the multi-element burst rule 182 specifies to burst elem1 and elem2 to the same object in the repository when they are both children of the root element in an XML document and when they appear in the order elem1, elem2. We assume the document 400 in FIG. 4 is now checked into the CMS that includes the multi-element burst rule 182 in FIG. 8 and that also includes a multi-element burst mechanism 184 as shown in FIG. 1. When document 400 is checked in, an object 900 is created with an object_id of 9829837 and a doc_name of doc. Both the elem1 and elem2 elements are bursted into a single object 1000 shown in FIG. 10, and a single link to document 1000 is added to document 900 at 910. The object_id of document 1000 is 9829840, and the doc_name is doc4. The text in object 1000 includes both elem1 and elem2. The multi-element burst rule 182 in FIG. 8 allows the multi-element burst mechanism 184 in FIG. 4 to burst both elem1 and elem2 to the same object 1000 as shown in FIG. 10.

Figure 11:
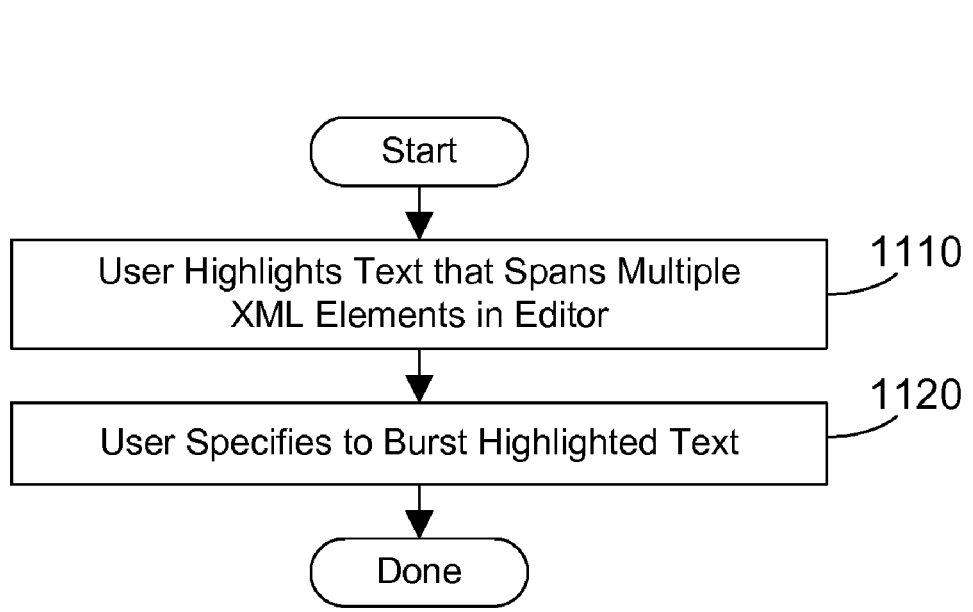
FIG. 11 is a flow diagram of a method for a user to specify multiple XML elements to be bursted.

Referring to FIG. 11, a method 1100 shows steps a user may perform when editing a document using a document editor, such as 122A in FIG. 1. A user may highlight text that spans multiple XML elements in the document editor (step 1110). The user may then specify to burst the highlighted text (step 1120). The editor may include a mechanism that forces the highlighting to begin and end at element boundaries. If this is the case, the highlighting in step 1110 will occur on element boundaries. For example, if a user clicks with a mouse to begin highlighting in the beginning of an element, when the editor detects the motion of the mouse forward to perform the highlighting, the highlight may be extended backward to the beginning of the element where the user began highlighting. In the alternative, step 1120 may detect when highlighting occurs that is not on element boundaries, and may adjust the elements selected by the highlighting to their boundaries to be bursted.

Figure 12:
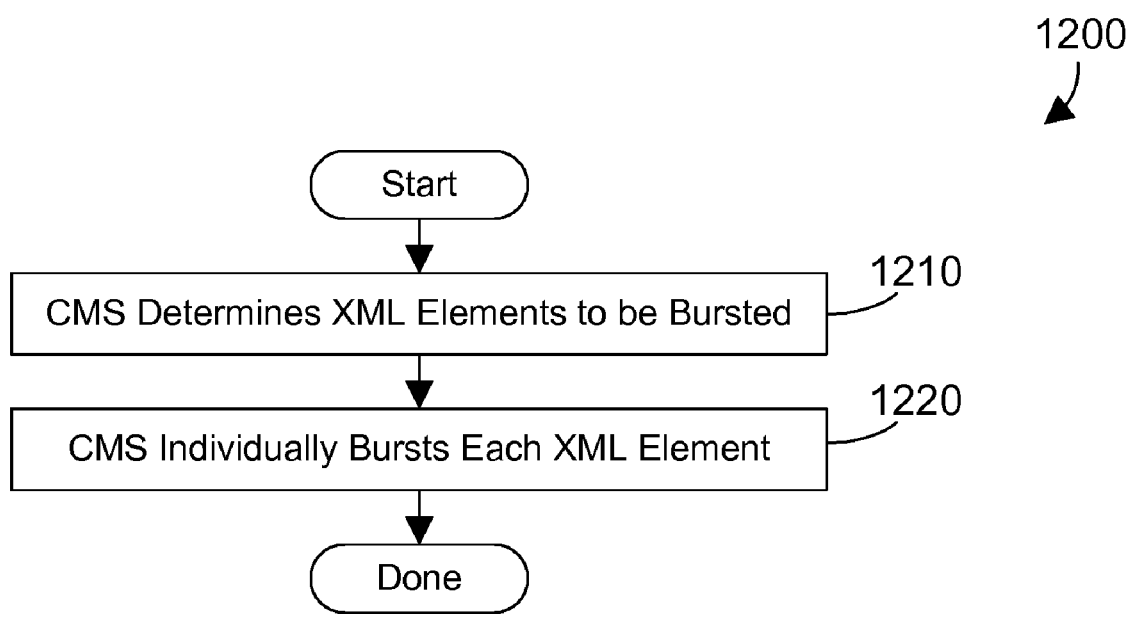
FIG. 12 is a flow diagram of a prior art method for bursting each XML element the user selected in FIG. 11 by individually bursting each element to its own object.

Referring to FIG. 12, 1 method 1200 is performed by a prior art content management system (CMS) when a document that was highlighted in method 1100 is checked into the repository. The CMS determines which XML elements were highlighted to be bursted (step 1210). The CMS then individually bursts each XML element into its own object in the repository (step 1220), as shown in the example in FIGS. 2-7 and explained above. In the prior art, even if multiple elements are selected by a user for bursting, the actual bursting operation by the CMS is done element-by-element, one at a time, each to its own object in the repository.

Figure 13:
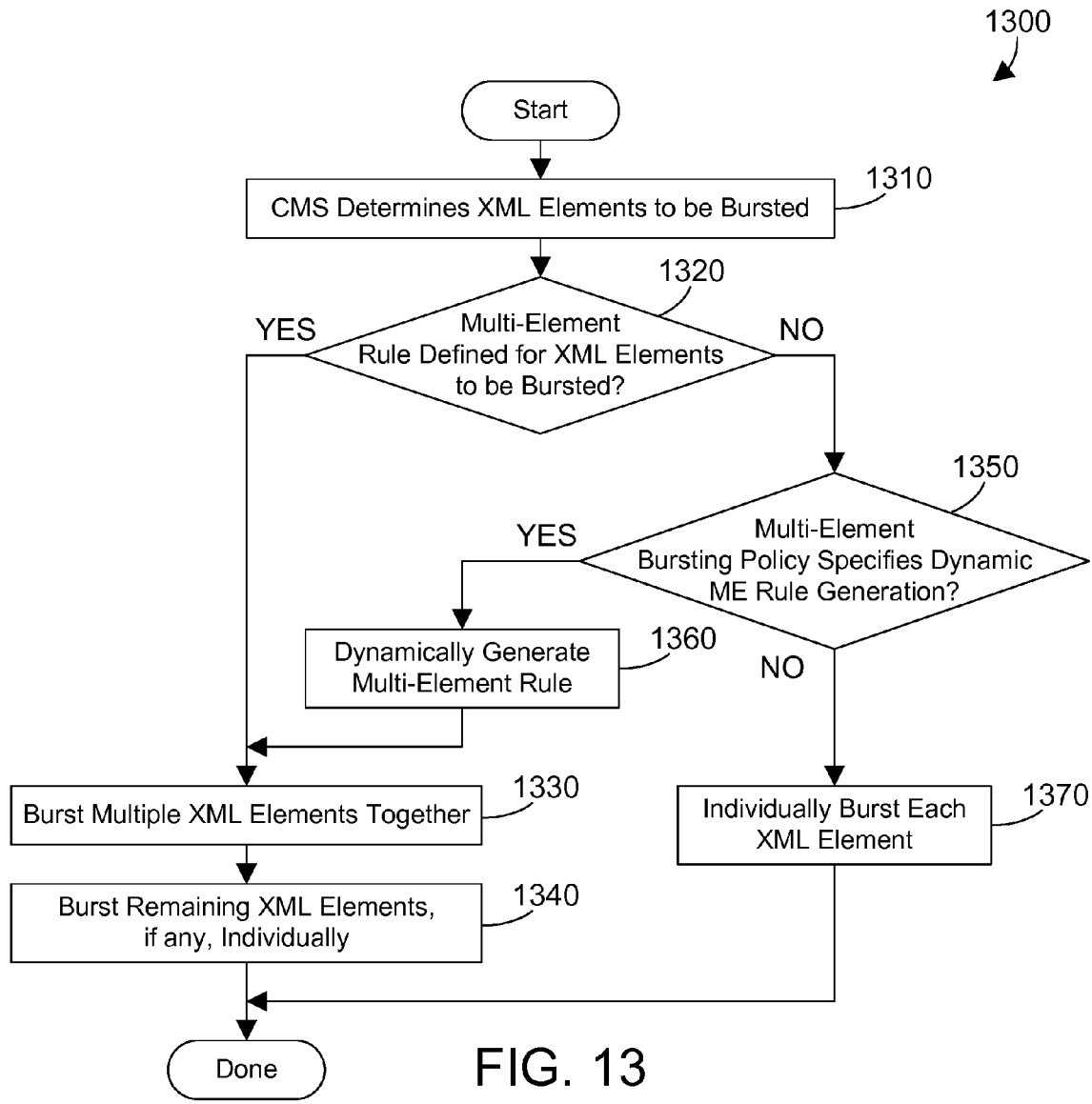
FIG. 13 is a flow diagram of a method performed by the multi-element burst mechanism 184 in FIG. 1 that allows bursting multiple elements together in a single object.
Figure 14:
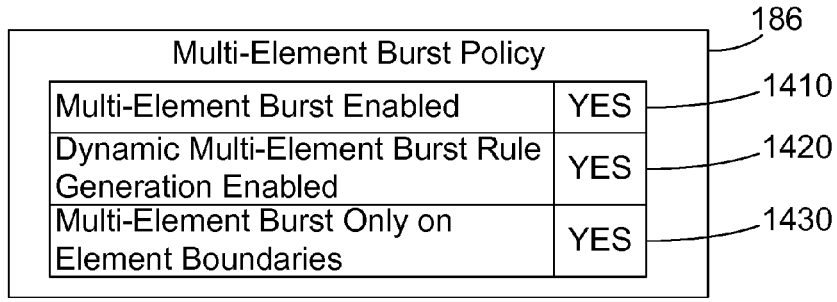
FIG. 14 is a sample multi-element burst policy that governs the operation of the multi-element burst mechanism 184 in FIG. 1.

FIG. 13 shows a method 1300 that allows bursting multiple elements into a single object in the repository. The CMS determines which XML elements will be bursted (step 1310). The CMS then checks to see if a multi-element rule is defined for the XML elements to be bursted (step 1320). If so, (step 1320=YES), multiple XML elements are bursted together in the same object in the repository (step 1330), and any remaining XML elements that were not bursted with other elements are bursted individually to their own respective objects in the repository (step 1340). If there is no multi-element rule defined for the XML elements to be bursted (step 1320=NO), method 1300 then checks to see if the multi-element bursting policy specifies dynamic multi-element rule generation (step 1350). A sample multi-element burst policy 186 is shown in FIG. 14 to include an entry 1410 that specifies whether or not multi-element burst is enabled, an entry 1420 that specifies whether dynamic multi-element burst rule generation is enabled, and an entry 1430 that specifies whether multi-element burst is only allowed on element boundaries. For the sample policy in FIG. 14, multi-element bursting is enabled in entry 1410, dynamic multi-element burst rule generation is enabled in 1420, and multi-element burst is only allowed on element boundaries in 1430.

If the multi-element bursting policy specifies dynamic multi-element rule generation is enabled (e.g., entry 1420 in FIG. 14 is YES)(step 1350=YES), a multi-element burst rule is dynamically generated (step 1360). Steps 1330 and 1340 are then performed as described above. If the multi-element bursting policy specifies dynamic multi-element rule generation is disabled (e.g., entry 1420 in FIG. 14 is NO)(step 1350=NO), each XML element is individually bursted to its own object in the repository (step 1370), similar to the way it is currently done in the prior art.

We now present an example that illustrates how multiple elements may be bursted when selection of elements at element boundaries is not enforced. This is referred to herein as free-form bursting, because any selected text may be bursted, regardless of the element boundaries. Referring to FIG. 15, we assume a schema is defined that defines elements elem1, elem2 and elem3 as string elements, and a root element. The complexType tag in the schema specifies the allowable sequence for these three elements as elem1, followed by elem2, followed by elem3. FIG. 16 shows two burst rules. The first burst rule is shown at 1610, which specifies to burst elem3 individually to an object in the repository. This burst rule 1610 is similar to known burst rules in the prior art. The second burst rule 1620 specifies to burst elem1 and elem2 together in the same object in the repository when they are found in the order elem1, elem2 in a document. The second burst rule 1620 is an example of a multi-element burst rule 182 in FIG. 1.

Referring to FIG. 17, we assume a sample document 1700 is being drafted by a user, and now includes elem1, elem2 and elem3 as shown in FIG. 17. We further assume the user highlights a portion of the document as shown by the bold and italicized text in FIG. 18. Note that the beginning of the highlighted portion begins in the middle of elem1, and the end of the highlighted portion ends at the elem2 boundary. We assume the user then requests the highlighted portion in FIG. 18 be bursted. This could be done, for example, by a user right-clicking a mouse and selecting a "burst together" menu selection in the document editor. Note that document 1700 in FIG. 17 shows the actual XML code, which may or may not be visible to the user. The user may simply highlight text to be bursted without any knowledge of the boundaries of the underlying XML elements.

In response to the user's request in the editor to burst the highlighted text in shown in FIG. 18, an object 1900 is created in the repository that contains the highlighted text. Note this object 1900 contains multiple elements because it includes part of elem1 and all of elem2. This object 1900 has an object_id of 9829841 and a doc_name of doc5.

Now we assume a different user creates a new XML document 2000 in FIG. 20, and would like to reuse the object 1900 in FIG. 19 that was bursted from document 1700 in FIG. 17. The user inserts the cursor at the place where they would like to insert the object 1900, indicated in FIG. 20 in bold and italics as (user's cursor is here). Before the insertion is allowed, the CMS performs some checks to assure the insertion is consistent with the schema in FIG. 15. The CMS recognizes that the parent element for the first part of this object is the same as the parent element where the user's cursor is located. In addition, the system checks the document's schema in FIG. 15 and the current state of the document 2000 in FIG. 20 to assure elem2 is a valid sibling to elem1. In this example in FIG. 20, both of these conditions are true, so the system inserts the appropriate text related to elem1 where the cursor is located, and then subsequently inserts the elem2 content as a new sibling to elem1. The resulting document with newly inserted content is shown in document 2000 in FIG. 21. The new content is shown in FIG. 21 in bold and italics.

When it is time for document 2000 in FIG. 21 to be checked into the repository, only the <?Insert?> processing instruction remains. Data between the various <?Start?> and <?End?> tags is stripped out by the system upon checkin. This is done in case changes are made to the linked object by another user. If changes are made to the linked object, then during a subsequent reconstitution (e.g., checkout) of the document, that object may need to be inserted differently. The document 2000 in FIG. 21 is stored in the repository as shown in FIG. 22, with an insert command referencing the stored object 1900 in FIG. 19.

The simple examples given above show how elem1 and elem2, or a portion of elem1 and all of elem2, can be bursted together into a single object in the repository. This is allowed, for the examples given above, when elem1 is present, when elem2 follows elem1, and when both are siblings under the root of the document. In another example, the schema for the document might define a range of choices to be matched when any of those elements are present in the document instead of a specific sequence of elements. The disclosure and claims herein expressly extend to the ability to burst multiple elements to a single object in the repository, regardless of how the multiple elements are selected.

The ability to burst multiple elements in a document to a single object in the repository aids in efficiently reusing content. In addition, dynamically generating multi-element burst rules allows a CMS to support the bursting of multiple elements to a single object in the repository. Specifying a multi-element burst policy enhances the flexibility for the multi-element burst mechanism by determining when it can perform bursting of multiple elements to a single object in the repository.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository of content in the memory; and
   a content management system residing in the memory and executed by the at least one processor, the content management system comprising:
      a plurality of rules that each specify at least one criterion related to content in the repository, the plurality of rules including a multi-element burst rule that specifies to burst multiple elements into a single object in the repository;
      a multi-element burst mechanism that analyzes a document when the document is checked into the repository, determines when multiple elements in the document satisfy the multi-element burst rule, and when multiple elements in the document satisfy the multi-element burst rule, storing the multiple elements in a single object in the repository, replacing the multiple elements in the document with a link to the single object in the repository, and storing the document with the link in the repository.

2. The apparatus of claim 1 wherein the content management system dynamically generates the multi-element burst rule.

3. The apparatus of claim 2 wherein content management system dynamically generates the multi-element burst rule based on a user's selection of multiple elements using a document editor.

4. The apparatus of claim 1 further comprising a document editor that allows a user to select multiple elements in a displayed document for bursting.

5. The apparatus of claim 4 wherein the selected multiple elements include a beginning or end that is not on an element boundary.

6. The apparatus of claim 1 further comprising a multi-element burst policy that specifies at least one criterion that determines when the multi-element burst mechanism bursts the multiple elements into the single object.

7. A computer-implemented method executed by at least one processor for a content management system to burst elements in a document to a repository, the method comprising the steps of:
   (A) analyzing the document to determine a plurality of elements in the document when the document is checked into the repository;
   (B) reading a multi-element burst rule that specifies to burst multiple elements into a single object in the repository;
   (C) storing the multiple elements from the document in the single object when the plurality of elements in the document satisfy the multi-element burst rule;
   (D) replacing the multiple elements in the document with a link to the single object in the repository; and
   (E) storing the document with the link in the repository.

8. The method of claim 7 further comprising the step of the content management system dynamically generating the multi-element burst rule.

9. The method of claim 8 wherein the content management system dynamically generates the multi-element burst rule based on a user's selection of multiple elements using a document editor.

10. The method of claim 7 further comprising the step of a user selecting multiple elements in a displayed document for bursting.

11. The method of claim 10 wherein the selected multiple elements include a beginning or end that is not on an element boundary.

12. The method of claim 7 further comprising the steps of:
   reading a multi-element burst policy that specifies at least one criterion that determines when the multiple elements in the multi-element burst rule may be bursted into the single object; and
   performing step (C) when the at least one criterion is satisfied.

13. A method for deploying computing infrastructure, comprising integrating computer readable code into a computing system, wherein the code in combination with the computing system perform the method of claim 7.

14. A computer-implemented method executed by at least one processor for a content management system to burst elements in a document to a repository, the method comprising the steps of:
   (A) displaying a document having a plurality of elements to a user;
   (B) a user highlighting multiple of the plurality of elements;
   (C) the user specifying to burst the highlighted multiple elements to a single object in the repository;
   (D) determining whether a multi-element rule is defined in the content management system for the highlighted multiple elements;
   (E) if no multi-element rule is defined in step (D), determining whether a multi-element burst policy allows dynamic multi-element burst rule generation;

(F) if the multi-element burst policy allows dynamic multi-element burst rule generation, dynamically generating the multi-element burst rule;
(G) if the multi-element burst policy does not allow dynamic multi-element burst rule generation, individually bursting each element to its own object in the repository;
(H) if a multi-element rule is defined in step (D), performing the steps of:
  (I) bursting multiple elements to a single object in the repository;
  (J) bursting each remaining element, if any, individually to its own object in the repository;
(K) if a multi-element burst rule is dynamically generated in step (F), performing steps (I) and (J).

15. An article of manufacture comprising:
(A) a content management system comprising:
  a plurality of rules that each specify at least one criterion related to content in a repository, the plurality of rules including a multi-element burst rule that specifies to burst multiple elements into a single object in the repository;
  a multi-element burst mechanism that analyzes a document when the document is checked into the repository, determines when multiple elements in the document satisfy the multi-element burst rule, and when multiple elements in the document satisfy the multi-element burst rule, storing the multiple elements in a single object in the repository, replacing the multiple elements in the document with a link to the single object in the repository, and storing the document with the link in the repository; and
(B) computer-readable recordable media bearing the content management system.

16. The article of manufacture of claim 15 wherein the content management system dynamically generates the multi-element burst rule.

17. The article of manufacture of claim 16 wherein content management system dynamically generates the multi-element burst rule based on a user's selection of multiple elements using a document editor.

18. The article of manufacture of claim 15 further comprising a document editor that allows a user to select multiple elements in a displayed document for bursting.

19. The apparatus of claim 18 wherein the selected multiple elements include a beginning or end that is not on an element boundary.

20. The article of manufacture of claim 15 further comprising a multi-element burst policy that specifies at least one criterion that determines when the multi-element burst mechanism bursts the multiple elements into the single object.

* * * * *